Figure 1:
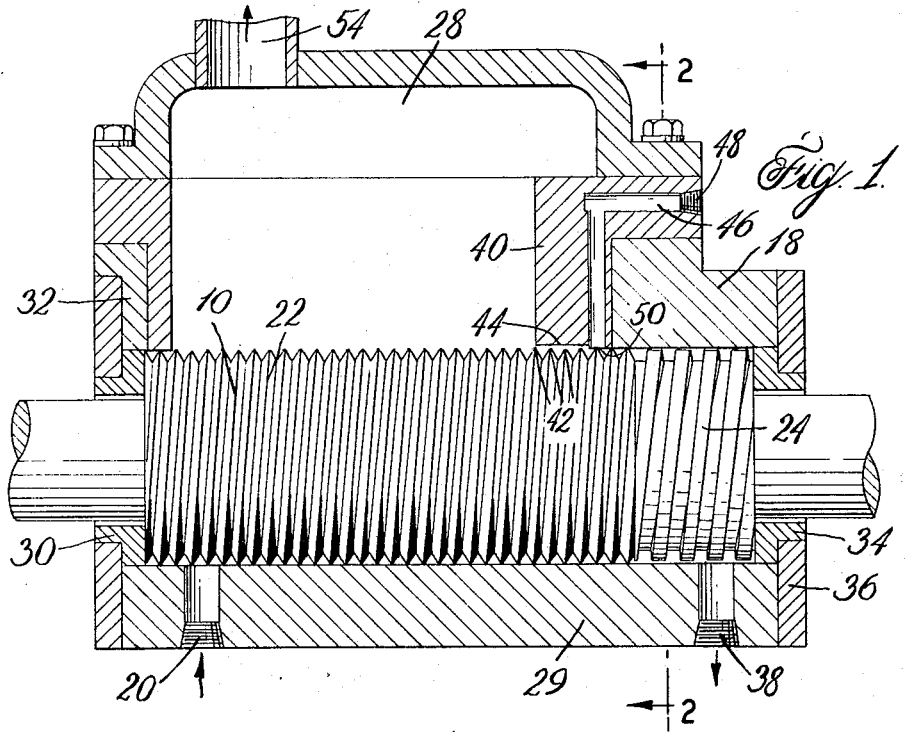

INVENTORS
FELIX P. KLOSEK
RICHARD E. NICOLSON
SYDNEY P. SPENCE

BY *Louis J. Bachand Jr.*
ATTORNEY 3,327,034
CONTINUOUS MILLING AND DEVOLATILIZING
PROCESS
Felix P. Klosek, Neshanic Station, Richard E. Nicolson, Martinsville, and Sydney P. Spence, Westfield, N.J., assignors to Union Carbide Corporation, a corporation of New York
Filed June 28, 1963, Ser. No. 291,362
6 Claims. (Cl. 264—85)

This invention relates to improved process and apparatus for simultaneously milling and devolatilizing plastic material. More particularly, the invention relates to process and apparatus for continuously milling and devolatilizing plastic materials which contain volatiles not readily removable by ordinary vacuum stripping techniques.

Many plastic materials in wide usage today demand very low levels of contamination either for further processing, required physical properties, or because of governmental regulation. These requirements have necessitated extended milling of plastic materials to bring residual contamination to a minimum. Unfortunately, as milling times are extended, degradation and other maleffects can occur.

It is an object, therefore, of the present invention to provide process and apparatus wherein, with brief milling times, plastic materials are brought to very low levels of residual contamination.

It is another object to provide improved milling and devolatilizing apparatus.

Other objects will appear hereinafter.

In the process of the present invention an improvement is provided in known methods of milling and conveying which generally comprise milling a plastic with parallel rolls having intermeshing helical threads with a radial clearance in excess of mechanical clearance between the threads in the zone of intermesh to form a bite for the passage of the plastic by feeding plastic to the rolls, reducing the plastic by rotating the rolls in counter directions to draw the plastic into the bite and to tear apart the plastic to expose fresh surfaces thereof upon emerging from the bite by continued rotation and adherence of the plastic to the separating helical threads, all while conveying the plastic longitudinally along the rolls. The improvement of the present invention comprises destroying stagnant vapor phase film on the freshly exposed surfaces of the material in the zone of maximum material heat by first introducing at said zone inert fluid at temperatures below that of the material therein, contacting said fluid with the freshly exposed surfaces of the material, moving the fluid over the surfaces at a velocity of at least one foot per second in a longitudinal direction counter to that in which the material is urged by the rolls.

Apparatus is provided for carrying out the above method constituting an improvement which enables removal of contaminants from said plastic material simultaneously with the milling and conveying thereof in apparatus comprising in combination a pair of parallel rolls having intermeshing left and right-handed helical threads and beginning, middle and terminal portions with respect to the conveying of plastic material, said threads having a V-shape in vertical cross-section for at least a major portion of the length of the rolls and a square shape for any remaining portions of the rolls, a housing enclosing and supporting the rolls, said housing extending in part at least about the middle of the rolls to provide a vapor outlet and completely encircling the terminal portion and means for rotating the rolls in counter directions; a saddle positioned closely adjacent the V-shaped threads of the terminal portions of the rolls axially extending across at least one flight (axial length of a thread) thereof and closely conforming thereto to define therewith a space for permitting passage of material corresponding to a zone of maximum heat for milled material; the improvement comprising a conduit leading from a source of inert fluid outside said housing to the space between the saddle and the terminal portions of the rolls whereby said fluid is contacted with the plastic material in said space and is passed out said vapor outlet.

Figure 2:
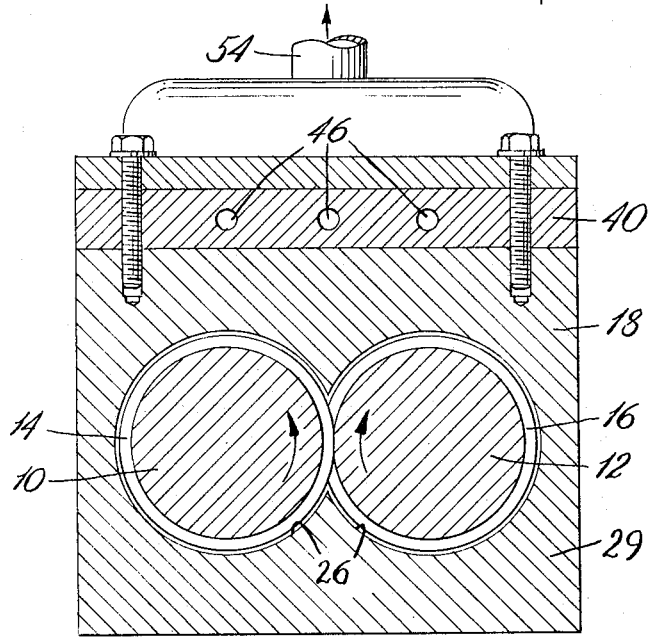

In the drawings:
FIG. 1 is a view in elevation, partly in section, illustrating a preferred embodiment of the present apparatus;
FIG. 2 is a sectional view in elevation, taken along line 2—2 of FIG. 1.

The advantages of the process and apparatus of the present invention are manifold. All plastic materials containing undesirable levels of volatile contaminants can be improved by the present invention. The term "contaminants" herein is used to refer to unwanted constituents of plastic materials and the term includes among other substances, solvents, decomposition products, unreacted reactants, additives both deliberate, such as modifiers, and accidental, such as moisture.

Specific instances of contaminants which are readily removable in accordance with the teachings of the present invention include these:

Removal of solvent, e.g. chlorinated solvents such as methylene chloride, from bisphenol-A polycarbonate. Heretofore the removal of this solvent, which can cause mold corrosion if not substantially completely removed from the plastic, has been attempted by conventional milling and stripping operations but these are believed to be responsible for a darkening of the milled product due to oxidation by incursive atmosphere. The devolatilization herein described removes solvents to acceptably low levels e.g. 300 parts per million based on the polycarbonate, by weight, and further provides the benefits of exclusion of atmosphere and cooling the plastic during milling thus inhibiting oxidative and heat degradation.

Removal of unreacted reactants, e.g. styrene from styrene homo- and copolymerization products. Use of the present method enables increased milling rates with no increase in residual monomer content in the milled product.

Removal of color bodies and odoriferous fractions from plastic masses, e.g. polyethylene, such as the particle form polyethylene described in U.S.P. 2,825,721 to J. P. Hogen et al. Injection of inert fluid (defined below) as herein described simultaneously deodorizes plastic masses and inhibits color body formations therein.

The term "inert fluid" herein refers to vapors, gases and liquids which are nonreactive toward plastic masses, thus the inert gases e.g. $N_2$ and water and steam can be used.

Steam is the preferred fluid to be used in milling accomplished in accordance with this invention, but it is not necessary that steam as such, be introduced into the mill. Water can be injected. The temperature of the introduced fluid is not critical. It is desirably lower than the material it contacts to provide a cooling effect. In parallel demonstration of stripping polystyrene of monomer using the mill herein described operated at 53 revolutions per minute, a 270° C. jacket temperature and a 77% solids feed stream (ca. 13 pounds per hour) results obtained were (a) without steam, 15% monomer in the product (b) with 20 pounds per hour of steam (1.5/1 $H_2O$/polymer ratio; velocity=30 ft./sec.), 1.8% monomer in the product and (c) with 1.1 pounds per hour of water (0.08/1 $H_2O$/polymer ratio; velocity 1 ft./sec.) 4.6% monomer in the product. All percentages are by weight.

Referring now to the drawings in detail, there is shown an apparatus comprising two parallel rolls 10, 12 of steel or other suitable material with intermeshing helical V-type threads 14, 16 completely enclosed by housing 18. These rolls lie with their axes in a horizontal or vertical plane. One thread 14 is left-handed or counterclockwise (viewed from the discharge end) and the other thread 16 is right-handed (clockwise); and the rolls are rotated in opposite directions (shown by arrows) so that the intermeshing surface areas move together upwardly to provide the bite.

Material is fed to the bite provided by the radial clearance between rolls in the zone of intermesh through inlet port 20 at a controlled rate. The threads on each roll can be divided into two sections, 22, 24 each of a different type; the major section 22 consists of V-threads for milling and extends about three-fourths the length and includes the beginning and middle portions of the rolls, while the terminal portion 24 has square threads for pumping. Both rolls are supported in the cast housing for rotation in a saddle shaped dual base 26, of a diameter to closely accommodate the rolls; but above the thread sections 22 a portion of the saddle shaped dual base in the block is absent to open into vapor space 28. Bearing 30 in wall 32 seals the rolls at that end; bearing 34 in wall 36 seals the rolls at the discharge end.

The roll shafts extend through the housing 18 to the drive means, timing gears, reduction gears and motors as is well known in the art.

Housing 18 has a discharge port 38 opening in the base of the block 29 through which the milled, devolatilized material is extruded or forced by the positive pumping action of the square thread sections 24 of the rolls.

Novelly with the present invention, there is provided over the terminal portion of the rolls 10, 12, a ported saddle 40 closely spaced above the threads and extending axially thereover a distance of at least one flight and preferably extending several flights where there are few leads per flight. The edge 44 of the block 40 can be tapered to minimize hang-up of material passing thereby. The thread crest to saddle distance should be just sufficient to enable passage of material. This insures intimate contact between steam and material at the zone of maximum material heat, due to the degree of milling material in this zone has received. A typical construction will be a mill having four inch diameter rolls with a spacing of 0.030 inch between thread crest 42 and block 40. Generally spacing will range from 0.01 to 0.2 inch. Constant or varying spacings may be employed. Provided in the saddle 40 is at least one conduit 46 having inlet 48 leading from an inert fluid source outside the mill (not shown) and outlet 50 from which inert fluid is discharged into the mass of material being milled. Provision of a plurality of outlets 50 circumferentially spaced about the rolls is preferred. The velocity at which inert fluid is moved over the surfaces of the material in the zone of maximum material heat between the saddle 40 and the threads 42 for best results should be at least one foot per second and can be 200 feet per second and higher. The fluid carrying away the stagnant vapor phase formed on the milled material during mill operation enters the vapor space 28 and is drawn out vapor outlet 54. Steam to product ratios are generally in the range of 0.01:1 to 2:1 and preferably are in the range of 0.5 to 1.5, especially 1:1. All ratios are by weight.

*Example*

The above described mill was used to purge methylene chloride from polycarbonate resin. A 1:1 steam/product ratio was used. The stripping of identical polycarbonate solution was effected with Normal Atmosphere, Vacuum, Concurrent Steam and Countercurrent Steam. The products were analyzed for parts per million of chlorine (p.p.m. Cl) and percent yield of degraded (yellow) and nondegraded (white) polycarbonate.

Results were:

| | Normal Atmospheric | Vacuum | Concurrent Steam | Countercurrent Steam |
|---|---|---|---|---|
| Cl, p.p.m. | 3,400 | 273 | 339 | 34 |
| Percent yellow | 22 | | 12 | 12 |
| Percent white | 83 | | 87 | 87 |

What is claimed is:

1. In the process of milling and conveying which comprises milling a plastic with parallel rolls having intermeshing helical threads with a radial clearance in excess of mechanical clearance between the threads in the zone of intermesh to form a bite for the passage of the plastic by feeding plastic to the rolls, reducing the plastic by rotating the rolls in counter directions to draw the plastic into the bite and to tear apart the plastic to expose fresh surfaces thereof upon emerging from the bite by continued rotation and adherence of the plastic to the separating helical threads, all while conveying the plastic longitudinally along the rolls; the improvement comprising destroying stagnant vapor phase film on the freshly exposed surfaces of the material in the zone of maximum material heat by first introducing at said zone inert fluid at temperatures below that of the material therein, contacting said fluid with the freshly exposed surfaces of the material, moving the fluid over the surfaces at a velocity sufficient to carry away the stagnant vapor phase in a longitudinal direction counter to that in which the material is urged by the rolls.

2. Process claimed in claim 1 wherein the inert fluid is steam.

3. Process claimed in claim 2 wherein water is introduced into said zone.

4. Process claimed in claim 2 wherein the steam to product ratio is in the range of 0.01:1 to 2:1 by weight.

5. Process claimed in claim 2 wherein the steam to product ratio is in the range of 0.5:1 to 1.5:1 by weight.

6. Process claimed in claim 2 wherein the steam to product ratio is approximately 1:1 by weight.

References Cited

UNITED STATES PATENTS

| 2,048,286 | 7/1936 | Pease | 18—12 |
| 2,308,632 | 1/1943 | Stenberg | 264—349 |
| 2,434,707 | 1/1948 | Marshall | 264—349 |
| 2,519,834 | 8/1950 | Hanson et al. | 18—2 |
| 2,615,199 | 10/1952 | Fuller | 18—12 |
| 2,763,896 | 9/1956 | Vogt | 264—349 |
| 3,040,005 | 6/1962 | Bernhardt et al. | 264—349 |
| 3,063,091 | 11/1962 | Marshall | 264—349 |
| 3,147,514 | 9/1964 | Reilly | 18—2 |

ALEXANDER H. BRODMERKEL, *Primary Examiner.*

DANIEL J. ARNOLD, *Examiner.*

F. S. WHISENHUNT, A. H. KOECKERT,
*Assistant Examiners.*